April 30, 1935.   A. MADLÉ   1,999,544
POWER TRANSMISSION MECHANISM
Filed Sept. 26, 1932   3 Sheets-Sheet 1
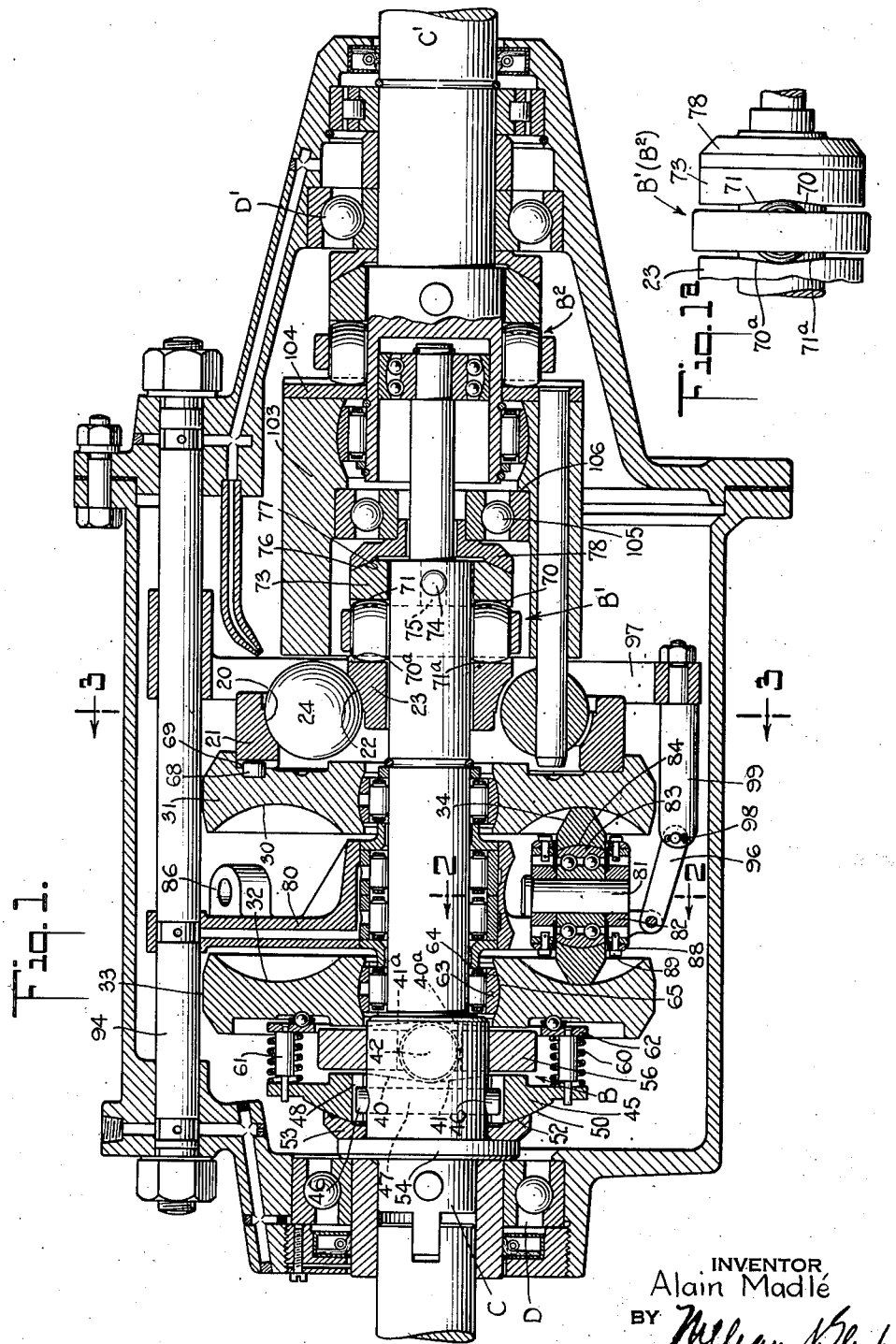
INVENTOR
Alain Madlé
BY
ATTORNEY April 30, 1935.  A. MADLÉ  1,999,544
POWER TRANSMISSION MECHANISM
Filed Sept. 26, 1932  3 Sheets-Sheet 2
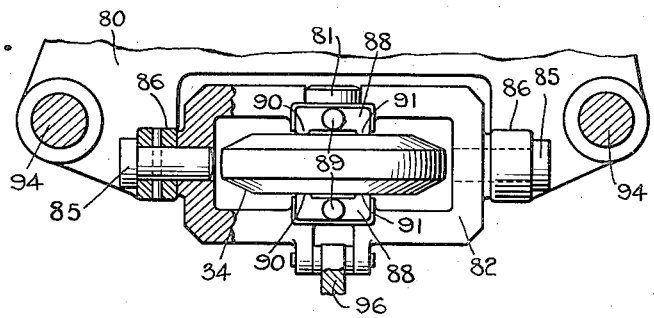
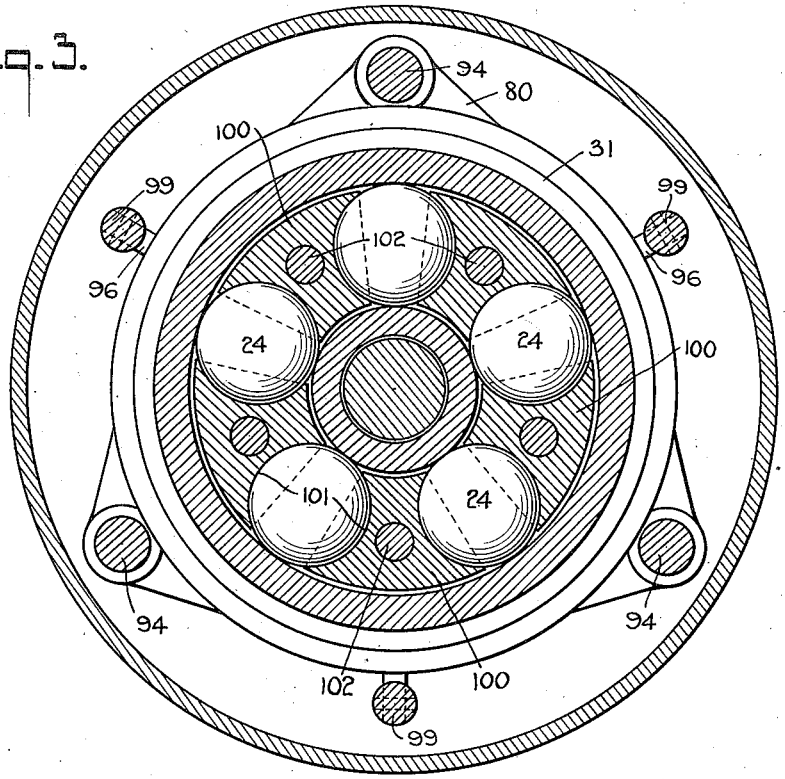
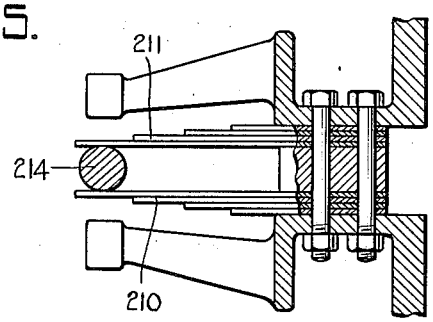
INVENTOR
Alain Madlé
BY
ATTORNEY

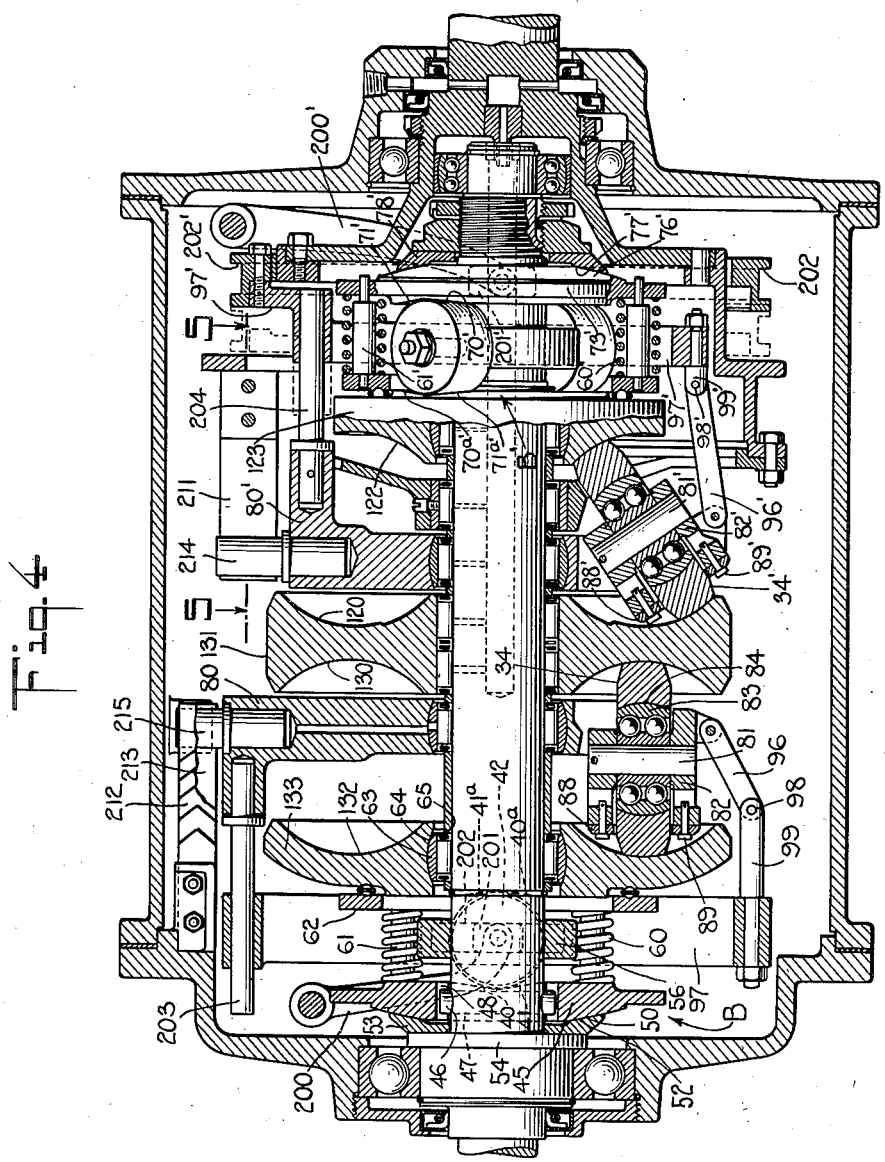

Patented Apr. 30, 1935

1,999,544

UNITED STATES PATENT OFFICE 1,999,544

POWER TRANSMISSION MECHANISM

Alain Madlé, New York, N. Y., assignor to Erban Operating Corporation, New York, N. Y., a corporation of New York Application September 26, 1932, Serial No. 634,894

20 Claims. (Cl. 74—281)

This invention relates to power transmissions of the planetary type.

One of the objects of my invention is the provision of speed modification by a planetary transmission, arrived at, by giving to the ultimate driven member of the planetary system, a speed which is the resultant of the individual speeds of the two other members of the system, and this I attain in the specific disclosure herein made, by so associating the three members of the system with each other and said two other members with the power input end, that said two other members are driven independently of each other from said power input end, and the third is driven simultaneously by both, and whereby the speed of said third member is the resultant of the speed of both of said other two members.

As the result of this manner of attaining a speed modification, the direction of movement of the ultimate driven member, which in the instant case is the third member referred to in the preceding paragraph, can be arranged for, as to be either positive or negative, it being understood for purposes of this specification that positive is a movement in one direction, and negative a movement in the opposite direction. It will further be understood that such an arrangement permits of the modification of the speed to give to the ultimately driven member, a zero drive, and by zero drive I mean a drive in which, even though the driving member is operating and the system is transmitting, yet the resultant speed applied to the ultimate driven member will be zero, and therefore the driven member will not be moving.

For purposes of convenience of reference, I will hereinafter refer to a speed modification of a planetary system in which the speed of the third or ultimately driven member is the resultant of the independent drives of the two other members as a differential reduction, and, therefore, wherever the term reduction appears in connection with the word differential or with any other context which imports a differential action as hereinabove referred to, it will be understood as being the equivalent of speed modification and as covering multiplication of speed, as well as reduction of speed in its limited sense, and each in both a positive and negative direction, and as covering also a zero drive as above defined, and which is neither positive or negative.

Another object of my invention is the provision of an arrangement whereby in a differential planetary reduction as hereinabove defined, a speed modification can be attained which is variable and which range of variability can be made to pass through the zero point, that is, can be made to pass from the positive to the negative or vice versa.

In the specific embodiment herein disclosed, I show a differential planetary reduction which comprises (a) races and rolling bodies in driving contact therewith, and in which the two races are driven independently of each other from the power input end, and (b) means for predetermining the speed of at least one of the two races. This arrangement therefore will give to the third and ultimately driven member a reduction predetermined in said manner of the speed of said race.

Further, I have illustrated in the specific embodiments of the drawings the aforementioned means as acting upon but one of the race rings of the reduction system, and as in the form of a second planetary system, and which system will hereinafter be referred to as the speed control system, although it will be understood that some of the objects of my invention will be attained regardless of the character of these controlling means. It will be further understood, of course, that while I have illustrated the differential reduction as resulting from the control, for reduction determination purposes, of one of the race rings of the differential reduction, that for purposes of my invention it is immaterial (a) which of the three members of the reduction system is the ultimate driven member and (b) whether only one or both of the other two members are acted upon by the controlling means.

It is another object of my invention to employ in connection with the differential reduction system and the control means associated therewith, an arrangement whereby a range of variability can be given to the speed reduction and in the illustrated embodiments, wherein both are shown as planetary systems of the adhesive type, I show this feature of my invention as effected by varying the driving ratio between the races and the rolling bodies of either one or both of the systems; and in the illustrated embodiments I show two specific manners of accomplishing this involving (a) the shifting of the members of one system relatively to each other so as to change the leverages between the three members of such system, or (b) the shifting of the members of both systems; and in the illustrated embodiment of (a) above I show this arrangement applied to the controlling system although it will be understood it can be equally well applied to the differential system.

It is within the purview of my invention that where the variation of the differential reduction is by means internal of the differential system, as by means of a control of three members of the reduction system in relation to each other to change the leverages therebetween, that this range of variability can also be employed for purposes of effecting the ultimate purpose of both a reduction and a range of variability in the reduction.

One of the important features of my differential reduction is the employment for that purpose of a planetary system all three members of which are driven, and more particularly in which the ultimately driven member is driven by, and at a speed which is the resultant of the individual speeds of, the other two members.

I have illustrated both systems as of the adhesive contact type to enable the three elements of one or the other or both to be shifted relatively for speed changes.

A power transmission employing adhesive contact must employ some arrangement for applying at the points of contact a pressure always correctly proportioned to the load. In an arrangement to which this invention has reference, such pressure is in the form of an axial component developed from the torque by a converting device, to be hereafter referred to as "a torque-loading device", and through which the axial component is delivered and applied to the adhesive systems.

Where such torque-loading device is constructed and related so as to be immediately responsive to change in the torque to develop at the points of adhesive contact the correct pressures without any substantial time lag, as where the torque-loading device is positioned intermediate of the source of such torque changes and such points of adhesive contact, such an arrangement will be effective, for the purposes above set forth, only where the torque changes or shocks are transmitted to the adhesive system through the torque-loading device.

It has already been pointed out that in the differential reduction system herein disclosed, the torque at the power input end is transmitted to two members of the system and that, therefore, while there is only one source, there are two lines along which the transmission is made therefrom and it is an object of this invention to interpose in both lines of transmission between the power input end and the differential reduction system, a torque-loading device for the purposes hereinabove referred to.

In addition to torque and torque changes originating at the power input end, and transmitted to the differential reduction system, shocks or impacts also originate at the output end and are transmitted therefrom to the systems, and such shocks will break the adhesive contact, if the gradients of these shocks or impacts are sufficiently great, and it is one of the objects of my invention to provide against such an occurrence.

In one embodiment I accomplish this by a compensation, by interposing between the source of such shocks or impacts and the systems, means such as a torque-loading device, and in another illustrated embodiment I accomplish this by reducing the gradient of the shocks or impacts delivered from the output end to below a predetermined maximum and then making proper provision for this reduced gradient.

For the attainment of these objects and such other objects as may hereinafter appear or be pointed out, I have illustrated embodiments of my invention in the drawings, in which:

Figure 1 is a longitudinal cross-section through the main axis of one embodiment of my invention;

Figure 1a is a view of the outside of one of the torque-loading elements;

Figure 2 is a section taken on line 2—2 of Figure 1;

Figure 3 is a section taken on line 3—3 of Figure 1;

Figure 4 is a section similar to that of Figure 1 showing another embodiment, and Figure 5 is a section taken through line 5—5 of Figure 4.

Before proceeding to describe my invention, I will premise that my arrangement contemplates one or more of the following features:—(a) The employment of a planetary reduction system; (b) that the input power shall be split and transmitted independently to two members of the reduction system, so that each of said members shall be driven independently of the other, so that the drive of the third and ultimate driven member shall be by both of said two members simultaneously, and its speed shall be the resultant of the individual speeds of the two members so driven by the split input power; (c) that in order to effect a drive of the ultimate driven member of the reduction system in one direction or the other, and to predetermine its speed, or in other words to obtain a predetermined speed modification, there shall be interposed in the line of transmission of the split input power to either or both of said two members of the reduction system, means for controlling the speed or direction of motion of either or both said members and in the specific embodiment herein disclosed, these means are in the form of a second planetary system, hereinafter to be referred to as the control system; (d) that for purposes of permitting of a variation in the predetermined reduction, that there be interposed somewhere between the input and output ends, means whereby the speed and the direction of movement, or both, of the ultimate driven members of the reduction system, can be varied or modified, and in one of the illustrated embodiments I disclose these means as imposed upon one of the planetary systems and herein shown for purposes of illustration as upon the control system, and as being in the form of an arrangement whereby the leverage between the three elements of said system can be varied, and in its more specific disclosure can be varied continuously, and in another embodiment as imposed upon both systems; (e) that torques and torque changes from all sources are so controlled, modified, or compensated for as to prevent the breaking of the adhesive contact upon the occurrences of impact shocks of high gradients, and (f) that the entire transmission and its elements shall be self-aligning about the same point.

Upon viewing Figure 1 of the drawings, it will be observed that I show at the left a rotating member C and at the right a rotating member C', and in the arrangement herein disclosed the member C will be assumed to be the driving member and the member C' the driven member, although it will be readily understood that this function of these two members can be reversed.

The torque from the driving member C is delivered to the member C' by means of the reduction system which comprises the race-way 20 formed on the inside face of the race ring 21, the opposed race-way 22 formed on the inside face of the race ring 23, and the rolling bodies 24, illustrated as balls, and being shown as in adhesive contact therewith.

The power from the input end, delivered to the driving shaft C is transmitted therefrom to the reduction system in a split form, part of the power being delivered along one line of transmission to the race ring 21 and part of the power being delivered along another line of transmission to the race ring 23.

In the embodiment illustrated in Figure 1, the race ring 23 is illustrated as driven with the speed of the driving shaft by the arrangement to be described hereinafter, and the race ring 21 is illustrated as driven through a control system for ratio control purposes in the manner which I will now describe.

The control system illustrated in the drawings comprises the race-way 30 formed on the inside face of the race ring 31, the race-way 32 formed on the inside of the race ring 33 and the interposed rolling bodies 34, shown as rollers for reasons that will hereinafter appear. The race ring 33, which is the driving or input end of this control system, is driven by the input power through a torque-loading device B and in turn drives the race ring 31 through the rollers 34. The torque-loading device serves to develop from the torque an axial component and to apply this component to the points of adhesive contact of the system.

The axial component delivered by the torque-loading device B to the points of adhesive contact is developed between sets of pairs of opposed and cooperating inclined surfaces 40, 40a and 41 and 41a. As many of these sets of inclined surfaces may be employed in the torque-loading device B as may be found necessary or desirable, although two are shown. Between each set of such inclined surfaces, is received a rolling body 42, and it will here be stated that I have found it desirable to employ rolling bodies at all points of frictional contact in my system so as to eliminate the introduction into the functioning of the system, of a coefficient of friction which is not constant and which, therefore, cannot be calculated for.

The inclined surfaces 40 and 41 are shown as formed on the inner face of a pressure member 45, and the cooperating inclined surfaces 40a and 41a are shown for purposes of this embodiment as formed on the outer surface of the race ring 33.

The pressure member 45 is in the form of a ring so received on the shaft that while it is rotated with the shaft, it will be able to move relatively thereto, but within the limits permitted by its manner of association and support. For this purpose, this ring 45 is shown in the drawings as loosely keyed on the shaft, as by means of the oppositely directed projections 46, formed, in the illustrated embodiment, at the extreme ends of a pin 47 transversely received through the shaft, and freely received in the opposed axial grooves 48 formed on the inner bore of the ring 45.

This ring has its outer surface 50 abutting against the inner surface 52 of a collar 53, which in turn is in abutting relation to a member 54 which can be associated with the shaft in any preferred or desired manner so as to serve as a thrust abutment. The cooperating surfaces 50 and 52 are both made spherical and conform to the same radius of curvature. The loose keying of the ring 45 on the shaft and the spherical bearing surfaces 50 and 52, serve to permit the ring to have a free universal movement on the shaft for the purpose that will appear hereinafter.

For taking up the thrust reaction of the axial component developed by the torque-loading member B, that is directed toward the input end, I show the angular contact ball-bearing shown at D to the left.

The rolling bodies 42 of the torque-loading device may be supported in any preferred or desired manner to serve their purpose as, for example, by the cage member 56 loosely received between the members 33 and 45, and in turn loosely carrying the rolling bodies 42.

For maintaining the transmission system, comprising as it does the races 31 and 33 and the transmission rollers 34 in assembled relation, I may, if desired, employ a means for applying a pressure sufficient, however, only for this purpose, as for example, by means of springs 60 supported in abutting relation to the member 45 and the ring 62, which is shown as in ball bearing relation to the race ring 33. The springs are received around the member 61, which is carried at one end from the ring 45 by means of a projecting pin and similarly carried at the other end in the ring 62.

From the description thus far given, it will be understood that where a torque or a change in the torque occurs at the end C, such torque will manifest itself immediately in the change of the pressure developed by the torque-loading device B, and because of the arrangement herein disclosed, and particularly the character of the mounting for the ring 45, that pressure will always be developed and equally distributed to the points of contact of the rolling bodies 42 of the torque-loading member and the race ring 33, which is required by the load.

I show in Figure 1 this race ring 33 as bearing upon the ring 63 by means of the spherical contacting surfaces 64 and 65, so as to support this race ring also for a universal adjustment. As a result of this arrangement, the pressure developed by the torque-loading member B, equally distributed to the points of contact between the torque-loading member and the race ring 33, as already set forth, is delivered by the race ring 33 to the points of adhesive contact between the race ring 33 and the rolling bodies 34, also under conditions which impel the equal distribution of the pressure upon such points of contact.

From the description thus far given, it will be understood that on branch of the split input power from the input end C is transmitted to and through the planetary controlling system to drive the controlling race 31, and I will now proceed to describe the illustrated arrangement whereby another branch of the split power from the input end and delivered to the shaft C, is transmitted along an entirely different path to drive the race ring 23 of the reduction system, and before doing so, I will here state that in the illustrated embodiments I show the ultimately driven race ring 31 of the controlling system and the race ring 21 of the reduction system, so associated that one shall be driven at the rate of the other, and more particularly I have shown them as associated so as to be driven directly one by the other and for this purpose I show the race ring 21 of the reduction system as keyed to the race ring 31 of the controlling system as, for example, by means of pins 68 projecting from one of the members and received in grooves 69 in the other.

The race ring 23 is driven from the shaft C in any preferred or desired manner and my arrangement contemplates the employment in this line of power transmission also, of a torque-loading member B' for developing an axial component between sets of pairs of opposed and cooperating inclined surfaces 70, 70a and 71, 71a, and between which inclined surfaces are received the rolling bodies for the reasons already referred to. The inclined surfaces 70, 71 are shown as formed on the inner face of a pressure member 73 and the cooperating inclined surfaces 70a and 71a are shown as formed on the outer surface of the race ring 23.

The pressure member 73 is also in the form of a ring loosely keyed on the shaft by means of oppositely directed projections of a pin 74 carried by the shaft and freely received in the opposed axial grooves 75 formed on the inner wall 75 of the ring 73. The self-alignment of the entire transmission including as it does the two planetary systems and the torque-loading member is completed by (a) supporting the race ring 23 loosely on the shaft so that it will be free to align on the shaft, (b) keying the race ring 21 of the reduction system to the race ring 31 of the control system, so that the former will align itself with and complete the self-alignment of the reduction system, and (c) the race ring 31 of the control system is made self-aligning by the spherical bearing surfaces 64 and 65, thus completing the automatic self-alignment of the control system.

It will be observed that the transmission including as it does the planetary system and the torque-loading devices, is made self-aligning not only as to its units but also the units as to each other and finally as an entirety, and, furthermore, that the self-alignment will always be symmetrical of and balanced with reference to the entire transmission.

It will be observed that my transmission system in its larger sense is made up of the following units: (a) The planetary reduction system and its associated torque-loading system, and (b) the planetary ratio control system and its associated torque-loading device.

It has been pointed out above that the elements composing each of these units are so constructed and associated as to be each self-aligning and that each unit as a whole is self-aligning with reference to the associated units, and upon studying the construction illustrated in the drawings, it will be appreciated that the arrangement is such that the entire transmission as well as each unit, and the members of each unit, are all self-aligning about what in effect is a single point in the plane centrally of and symmetrical with reference to the plane defined by the points of adhesive contact of the rollers 34 with reference to the race ring 31 and the race ring 33.

Therefore, in this manner I attain one of the important objects of my invention which is the distribution of pressures uniformly upon all points of adhesive contact and the attainment of this object is supplemented by the elimination of variable factors of friction which might in any way adversely effect the proper calculation of the transmission of pressures, and this is effected also by the fact that the frictional components are all constant both in the static and dynamic conditions, so that these factors are also capable of calculation.

The ring 73 has its outer surfaces 76 spherical and abutting against the inner surface 77 of a collar 78 which is also spherical and conforms to the surface 76 and which in turn is in abutting relation to a thrust bearing to be more fully hereinafter referred to, all for the purpose of completing the self-aligning of this particular end of the system.

From the description thus far given, it will be observed in the specific embodiment of Figure 1 that (a) the race ring 23 of the reduction system is driven at any speed imposed upon it by the shaft and in the instant case it is the speed of the shaft; (b) the race ring 21 is driven at a speed which is that imposed upon it by the race ring 31 of the control system; (c) the speed of the race ring 31 of the control system is that which is imposed upon it by the leverage between the members composing that system, and (d) therefore the rolling bodies 24 will move at a speed which is the resultant of the speed of these two race rings 21 and 23.

While in connection with the description of the control system, I have stated that the springs 60 serve to maintain the elements of said system in assembled relation, it will be understood that these springs will serve their aforementioned function for the entire transmission including both planetary systems.

My invention further contemplates the variable control of the reduction ratio and before describing the details of the arrangement herein disclosed for accomplishing this, I will premise that (1) the variation is attained by a change in leverage between the elements of the control system; (2) to permit of such change in leverage, the rolling bodies are shown as in the form of rollers; (3) the change in leverage is attained by a tilting of the rollers, and (4) the tilting of the rollers is attained by angling the rollers about their points of adhesive contact with the races. The action of the rotation of the races upon the angled rollers as long as the rollers remain angled will be such as to cause the rollers to roll transversely of their normal path of travel to successively new positions of tilt until the desired change in tilt has been reached.

For the maintenance of the proper adhesive contact between the surfaces of contacts of the rollers 34 of the control system and the toric surfaces of the races 31 and 33, the contacting surfaces of these rollers are generated for this purpose and are of a transverse radius not in excess of, and preferably smaller than, the transverse curvature of the toric surfaces 30 and 32, and the centers of the rollers are shown as in the locus or path of a circle that generates these toric surfaces.

Upon viewing Figures 1 and 2 of the drawings, it will be observed that rollers 34 are each carried in a frame 82. These frames 82 are each mounted for pivotal movement about an axis diametrical of the roller and perpendicular to the axis through the point of the roller with the races, as by means of pins 85 about which the frame 82 swivels. The pins in turn are mounted in ears 86, (see Figure 2) fixedly related to and carried by the cage 80.

To impose upon the rollers 34 the aforementioned angling movement so as to position each roller angularly of its normal path of travel, and thus permit the rotation of the races to translate the rollers to successively new positions as the races rotate, I employ an arrangement which comprises generally a universal support for each roller and means controlled by the tilting of the frames 82 to cause each roller to angle in that direction determined by the direction of tilting of the frame, and in Figure 1, this universal support for each roller is attained by mounting it upon a self-aligning bearing 83 carried by the pin 81 which in turn is supported from the frame 82, the roller having the cooperating spherical bearing surface 84. In this manner, the roller 34 can assume any position relatively to the frame within the limits fixed by the design.

In Figure 2 I show elements 88 carried by the frame 82 in the manner shown in the drawings for the selective application of turning pressures to the rollers to determine the direction of the angular movement wherein these elements are illustrated as each supported about a pin 89, carried by the frame, so as to pivot about an axis parallel to the axis diametrically through the points of adhesive contact of the rollers with the races.

The selectivity of the application of pressure to each roller is attained by employing at least two such members 88 for each roller, one to each side of the roller and preferably in opposed relation, and by so designing these members as to provide them each with a plurality of points of pressure application to the rollers, as shown at 90 and 91, and positioned on opposite sides of the pivot pins 89, whereby as will be pointed out, the direction of movement of the frames 82 about the axis of the pins 85 will determine which of each set of members 88 is moved into contact with the roller, and the direction of the rolling movement of the rollers determine through which pressure point 89 of the selected member, the angling movement of the roller will be effected.

The roller frames 82 and their attendant and associated parts are all supported from the roller carrier or cage 80 which bears about one of the rotating members C or C', as shown in Figure 1, and is held against rotation in any preferred or desired manner, as, for example, by means of the stay bolts 94 engaging through outer portions of the cage.

The frames 82 are moved angularly in any preferred or desired manner as by control levers or links 96 which in turn are operated simultaneously and in unison by the regulating disk 97, to which each of the links 96 is connected as by a pivot 98 and a bolt 99 which is shown as fixedly associated with the disk 97. The disk 97 in turn is supported for rectilinear movement along the axis of the transmission in any preferred or desired manner, as, for example, by being associated with and carried by the bolts 94, already referred to in connection with the cage 80.

The rectilinear movement may be imparted to this controlling disk 97 in any preferred or desired manner.

From this description of the speed ratio changing of the control apparatus, it will be understood that any movement given to the controlling disk 97 will cause the links 96 to give the frames 82 an initial angular movement relatively to the rollers to bring the elements 88 on one side or the other of each roller, into contact with that roller, and upon such contact, the rotation of the roller in one direction will automatically cause the advanced pressure point 90 or 91, as determined by the direction of rotation of the roller, to be moved into contact with the roller, and the remote pressure point to be moved out of contact therewith, and upon a continuation of the movement of the disk 97, the aforementioned active contacting pressure applying point will move the roller angularly to increasing extents. Due to this change in its angular position, the roller will roll diagonally across the face of the races to change its tilt. The controlling member 97 is moved, as set forth, until a tilt of the rollers is reached to give the desired speed change. When the controlling disk stops moving, however, the rollers will continue to move diagonally and in such movement will move away from that pressure-applying element 88 which has been causing it to angle, and will move into contact with the pressure-applying element on the other side of the roller, and in such movement will act in connection with the two points of pressure application 90 and 91 on that side, the same way as it did as to the first-mentioned pressure-applying element 88 in connection with the initiation of the movement to cause a restoration of the rollers to a position in the normal path of their travel.

The output power is taken off the rolling bodies 24 of the reduction system, and I show in Figures 1 and 3 one arrangement for purposes of exemplification by which this is accomplished. This arrangement comprises spacer members 100 having spherical bearing surfaces 101 for the balls 24 and each in turn loosely carried by pins 102 projecting forwardly from the member 103 which in turn is supported by and in driving connection with the driven shaft C'.

In connection with the splitting of the input power and the transmission of the split branches to the adhesive systems independently of each other, I have already set forth that the pressure requirements under all conditions are properly accommodated by the torque-loading members B and B', and I will now describe my arrangement by which any impacts or shocks delivered through the driving end C' are also properly accommodated, and in the embodiment of Figure 1 converted into an axial component which is delivered to the reduction system, for which purpose I employ a third torque-loading device $B^2$, and before describing $B^2$, I will premise that the disclosure herein made thereof contemplates the attainment of a further object of my invention by delivering power to the reduction system through one of the torque-loading members interposed in the path of the input power to said system.

This third torque-loading member shown generally at $B^2$ at the right of Figure 1 has been illustrated as a substantial duplicate both as to its structure and functioning as the torque-loading member B' already described, and the illustration of the details of construction of the torque-loading member B' will suffice also for the torque-loading member $B^2$. It will be understood that the torque-loading member $B^2$ has been so illustrated for purposes of convenience of illustration and design.

The axial component developed by the torque-loading member $B^2$ is delivered to the member 103 through the member 104 and thence to the angular contact thrust bearing 105 by which it is transmitted to the member 78 already described as being in spherical bearing relationship to the pressure ring 73 of the torque-loading member B', by the abutment portion 106.

It will thus be seen that I have attained the further object of my invention as to the accommodations of a system for torque changes from all possible sources and more particularly to torque changes of an impact character originating at the driven end of the system, and in connection with torque changes originating at the driven end of the system, I show at D' a thrust bearing constructed and functioning at that end of the system, as does the thrust bearing D at the other end of the system.

For convenience in describing Figure 4, which is a second of the many embodiments which my invention may take for attaining one or more or all of the features of my invention, brief reference will first be made to those features wherein the embodiment of Figure 4 differs from that of Figure 1 and to the design of these features in Figure 4 as contrasted with that of Figure 1.

(a) The variation in the reduction is shown in Figure 1 as attained by means in that branch of the split power transmission of which the control system forms a part, and specifically as internal to and forming part of the control system, although, as was stated, such means can be external to said branch or both internal and external thereof and in Figure 4 is illustrated the attainment of a variability of the reduction by means external of that branch of the split power of which the control system forms a part and more particularly by means internal of and forming part of the reduction system and as a further development thereof by means internal of both systems so that the variability of the reduction in Figure 4 will be the resultant of the functioning of two means, namely of that internal to the branch of which the control system forms a part as specifically illustrated in Figure 1 and of that internal of the reduction system.

Embodiments in which the input power is split into more than two branches permit of even a wider variation.

Upon viewing Figure 4, it will here be observed that the control system for giving the reduction a range of variation has for purposes of convenience of description been illustrated as the same as in Figure 1, as has also the torque-loading device associated with this control system, except as to details to be referred to shortly, and therefore the same reference characters are employed for both of these assemblies as in Figure 1, and the description thereof in Figure 1 will also serve as the description for these assemblies in Figure 4.

The means internal of the reduction system, for giving a range of variation to the reduction is illustrated in Figure 4 as comprising an arrangement for changing the leverages between the members of the reduction system, similar to that employed for a similar purpose in the control system of both embodiments and for this purpose the raceways 120 and 122 of the reduction system of Figure 4 are formed on the inside of the race rings 131 and 123 just as described in connection with the race rings 31 and 33 of the control system and receive between them rollers tiltable for leverage changes by the same arrangement as are the rollers of the control system and which are tilted to varying degrees also by an arrangement which in all respects is substantially the same as that described as employed with the control system of Figure 1 for this purpose, and here again for convenience of description, the same reference characters, each, however, primed has been applied to these parts of Figure 4 as has been applied to the corresponding parts of the leverage changing arrangement in the control system of Figure 1, and the description of these corresponding parts in Figure 1 can be read in connection with the same arrangement in the reduction system of Figure 4 with the reference characters primed as set forth.

The torque-loading device B' associated with the reduction system in Figure 4 has also for convenience of illustration been shown as substantially the same as the torque-loading device B illustrated as associated with the control system of Figures 1 and 4, and for convenience of description, the same reference characters primed, however, have been applied thereto as in Figure 1, and the description thereof in Figure 1 with reference characters primed will serve as the description of this torque-loading device in Figure 4.

The mechanism for controlling the tilt of the rollers of each of the planetary systems of Figure 4 is substantially the same as that illustrated and described in connection with the control system of Figure 1, except that in Figure 4 (1) the control levers or links 96 are shown as directed oppositely to that of Figure 1 to give clearance for the levers 96', and the regulating disk 97', for controlling the tilt of the rollers of the reduction system; (2) the ring 97 associated with the control system is shown in Figure 4 as reciprocated by lever 200 through a sliding member 201 received in the groove 202 formed in the ring 97, and the ring 97' is shown as formed with a groove and as reciprocated by a lever 200' through a sliding member 201', received in the annular groove 202' formed in said ring 97', and (3) the rings 97 and 97' are each shown as guided in their reciprocation by pins 203 and 204 received therethrough, and shown as supported from the roller carriers 80 and 80' in any preferred or desired manner as, for example, as shown in Figure 4, and (4) the roller carrier 80' of the reduction system is the driven member and rotates, whereas the roller carrier 80 of the control system only rotates within the limits of the resilient support hereinafter referred to.

(b) The torques of the input power in the split branches are shown in Figure 1 as first delivered to torque-loading devices, so related as to develop reactions which balance each other and the shocks originating at the output end are shown as first delivered to a third torque-loading device, which also develops a reaction for which, however, there is no balancing factor. It is because of the presence of this unbalance, incident to the presence of the third torque-loading device, that the bearings D, D' are shown as employed in Figure 1.

In the embodiment of Figure 4, I show an arrangement whereby the shocks from the output end are taken care of by means which do not require an unbalanced axial component, and which are employed in the place of the aforementioned third torque-loading member, and as a result of which the thrust bearing D, D' can be dispensed with. This arrangement can be broadly described as resilient elements in the path of transmission of such shocks to the planetary systems and which serve to reduce these shocks to below a predetermined maximum and which can therefore be calculated and for which definite provision can be made. These elements are shown in Figures 4 and 5 as in the form of packs of leaf springs 210 and 211 carried from the driven end and positioned on opposite sides of and embracing the pin 214 carried by and projecting outwardly from the carriage 80'. These springs 210 and 211 are designed and associated with the carriage to attain my objective of reducing to below the predetermined maximum, impacts originating at the output end and transmitted to the carriage 80' of the reduction system. I provide for these impacts so reduced, by designing the springs 60 and 60' in the torque-loading device B and B' in Figure 4, as to serve, not only to maintain the parts in associated relation, but also additionally to apply to the compound system, an axial component which is constant and which is sufficient to take care of this predetermined maximum below which the impacts are reduced.

It is by such an arrangement that I am enabled to avoid an unbalanced axial reaction component and thus dispense with thrust bearings D and D'.

The employment in connection with the carriage 80 of the control system of a spring buffer arrangement similar to that shown in connection with the reduction system, serves a purpose specifically in connection with that element, and generally in connection with the control system in its entirety, in that it will serve as a spring buffer for that element as against shocks from all directions, and in Figure 4 I disclose pack springs 212 and 213 as similarly associated with the roller carriage 80 of the control system except that as that carriage is stationary the springs 212 and 213 are carried by the housing and the carriage 80 here also is provided with a pin 215 to opposite sides of which springs 212 and 213 are positioned for firm embracement.

(c) In the embodiment of Figure 1, the drive from the control system to the race ring 21 of the reduction system is through the race ring 31 of the former, which is separate from the race ring 21, and is keyed thereto as shown in Figure 1. In Figure 4, on the other hand, I show the substitution of these two race rings by a single race ring 131 which is provided with the raceways 120 and 130 and as a result of this arrangement supplemented by the self-alignment of all parts to opposite sides thereof, the entire transmission system and the torque-loading devices associated therewith, is self-aligning about this race ring 131.

Having described my invention what I claim as new, and desire to secure by Letters Patent, is:

1. In a device of the character described, in combination, a plurality of torque-transmitting members, operative means between said members comprising a system of two rotating races and rolling bodies, means for transmitting split portions of the torque from one of said members to each of the two races, the rolling bodies being operatively associated with the other of said members and being driven at a rate of speed which is the resultant of the speed of the races, and an independent torque-loading device interposed in the path of the input torque to each of said races.

2. In a device of the character described, in combination, a plurality of torque-transmitting members, operative means between said members comprising a system of races and rolling bodies, and a torque-loading device interposed in the path of the input torque to each of said races and also in the path of torque to the system from the driven end.

3. In a device of the character described, in combination, a plurality of torque-transmitting members, operative means between said members comprising a system of races and rolling bodies, means for transmitting split portions of the torque from one of said members to each of the two races, the rolling bodies being driven at a rate of speed which is the resultant of the speed of the races, and a torque-loading device interposed in the path of the input torque from one of the members to each of said races and in the path of the torque from the other member to the system.

4. In a device of the character described, in combination, a plurality of torque-transmitting members, means for driving one member from the other, said means comprising a planetary reduction system comprising races and rolling bodies, the races being free to be driven, means for splitting the torque from one of the torque-transmitting members and transmitting the split branches separately to the races, the rolling bodies being driven by the races at a speed which is the resultant of the speeds of the races and in turn driving the other torque-transmitting members, means interposed in the path of transmission of torques or impacts to the system for preventing the transmission thereto of an undesired character of torque, said means comprising a torque-loading device in the path of transmission of the input power, and an impact reducer in the path of transmission of shock from the output end.

5. In a device of the character described, in combination, a plurality of torque-transmitting members, means for driving one member from the other, said means comprising a planetary reduction system comprising races and rolling bodies, the races being free to be driven, means for splitting the torque from one of the torque-transmitting members and transmitting the split branches separately to the races, the rolling bodies being driven by the races at a speed which is the resultant of the speeds of the races and in turn driving the other torque-transmitting members, and means interposed in the path of transmission of torque or impacts to the system for preventing the transmission thereto of an undesired character of torque, said means comprising a torque-loading device positioned in each line of transmission of the split branches of input power to the system and also in the line of transmission of impacts from the output end.

6. In a device of the character described, in combination, a plurality of torque-transmitting members, means for driving one member from the other, said means comprising a planetary reduction system comprising races and rolling bodies, the races being free to be driven, means for splitting the torque from one of the torque-transmitting members and transmitting the split branches separately to the races, the rolling bodies being driven by the races at a speed which is the resultant of the speeds of the races and in turn driving the other torque-transmitting members, and means interposed in the path of transmission of torque or impacts to the system for preventing the transmission thereto of an undesired character of torque, said means comprising a torque-loading device positioned in each line of transmission of the split branches of input power to the system and also in the line of transmission of impacts from the output end, the last torque-loading device cooperating with the system through one of the first-mentioned torque-loading devices.

7. In a device of the character described, in combination, a plurality of torque-transmitting members, means for driving one member from the other, said means including a planetary reduction system comprising races and rolling bodies, the races being free to be driven, means for splitting the torque from one of the torque-transmitting members and transmitting the split branches separately to the races, the rolling bodies being driven by the races at a speed which is the resultant of the speeds of the races and in turn driving the other torque-transmitting member, a system of races and rolling bodies for variably controlling the speed of one of the races, the entire transmission including both systems being self-aligning, and means interposed in the paths of transmission of the split branches to the system for modifying the action of the torques transmitted along said paths, said means being so constructed and related as to develop balanced and opposed axial reactions, whereby thrust bearings for taking care of such reactions can be dispensed with.

8. In a device of the character described, in combination, a plurality of torque-transmitting members, means for driving one member from the other, said means including a planetary reduction system comprising races and rolling bodies, the races being free to be driven, means for splitting the torque from one of the torque-transmitting members and transmitting the split branches separately to the races, the rolling bodies being driven by the races at a speed which is the resultant of the speeds of the races and in turn driving the other torque-transmitting member, a system of races and rolling bodies for variably controlling the speed of one of the races, the entire transmission including both systems being self-aligning, means interposed in the paths of transmission of the split branches to the system for modifying the action of the torques transmitted along said paths, said means being so constructed and related as to develop balanced and opposed axial reactions, whereby thrust bearings for taking care of such reactions can be dispensed with, and means interposed in the path of transmission of impacts from the output end for modifying the effect of impacts so delivered, said least means being so constructed and related as to develop no axial reaction.

9. In a device of the character described, in combination, a plurality of torque-transmitting members, means for driving one member from the other, said means including a planetary reduction system comprising races and rolling bodies, the races being free to be driven, means for splitting the torque from one of the torque-transmitting members and transmitting the split branches separately to the races, the rolling bodies being driven by the races at a speed which is the resultant of the speeds of the races and in turn driving the other torque-transmitting member, and a system of races and rolling bodies for variably controlling the speed of one of the races, the entire transmission including both systems being self-aligning.

10. In a device of the character described, in combination, a plurality of torque-transmitting members, means for driving one member from the other, said means including a planetary reduction system comprising races and rolling bodies, the races being free to be driven, means for splitting the torque from one of the torque-transmitting members and transmitting the split branches separately to the races, the rolling bodies being driven by the races at a speed which is the resultant of the speeds of the races and in turn driving the other torque-transmitting member, and a system of races and rolling bodies for variably controlling the speed of one of the races, the entire transmission including both systems being self-aligning about a common plane.

11. In a power transmission system two torque transmitting members and means for transmitting power from one member to the other, comprising two coaxial serially related systems of races and rolling bodies in adhesive contact therewith, said rolling bodies being resiliently supported in floating position for angular displacement about the axis of the system whereby variation of their positions about a neutral point in response to reactions on said rolling bodies is permitted, the power flow passing into one race of each of said systems and between the rolling body of one of said systems and one of said members, and means intermediate each of said members and one of said systems for generating the axial pressure necessary for the adhesive contact of said races and rolling bodies.

12. In a power transmission system two torque-transmitting members and means for transmitting power from one member to the other, comprising two coaxial, serially related systems of races and rolling bodies, said rolling bodies being resiliently supported in floating position for angular displacement about the axis of the system, whereby variation of their positions about a neutral point in response to reactions on said rolling bodies is permitted, the power flow passing into one race of each of said systems and between the rolling bodies of one of said systems and one of said members.

13. In a power transmission system two torque-transmitting members and means for transmitting power from one member to the other, comprising two coaxial, serially related systems of races and rolling bodies, said rolling bodies being resiliently supported in floating position for angular displacement about the axis of the system, whereby variation of their positions about a neutral point in response to reactions on said rolling bodies is permitted, the power flow passing into one race of each of said systems and between the rolling body of one of said systems and one of said members, and means intermediate one of said members and one of said races for generating an axial pressure in the system proportional to the torque transmitted by said member, in order to maintain the adhesive contact of said races and rolling bodies.

14. In a device of the character described, in combination, a plurality of torque-transmitting members, means for driving one member from the other, said means comprising a planetary reduction system comprising races and rolling bodies, the races being free to be driven, means for splitting the torque from one of the torque-transmitting members and transmitting the split branches separately to the races, the speed of one of said races being variable and the rolling bodies being driven by the races at a speed which is the resultant of the speeds of the races and in turn driving the other torque-transmitting members, and independent torque-loading means interposed in each path of transmission of torque or impacts to the system for preventing the transmission thereto of an undesired character of torque.

15. In a device of the character described, in combination, a plurality of torque-transmitting members, means for driving one member from the other, said means including a planetary reduction system comprising races and rolling bodies, the races being free to be driven, means for splitting the torque from one of the torque-transmitting members and transmitting the split branches separately to the races, the rolling bodies being driven by the races at a speed which is the resultant of the speeds of the races and in turn driving the other torque-transmitting member, a system of races and rolling bodies for variably controlling the speed of one of the races, and torque-loading means for generating axial pressure components for maintaining adhesive contact between the races and rolling bodies interposed in each of the paths of transmission of the split branches to the system for thereby modifying the action of the torques transmitted along said paths, said means being so related as to develop balanced and opposed axial reactions, whereby thrust bearings for taking care of such reactions can be dispensed with.

16. In a device of the character described, in combination, a plurality of torque-transmitting members, means for driving one member from the other, said means including a planetary reduction system comprising races and rolling bodies, the races being free to be driven, means for splitting the torque from one of the torque-transmitting members and transmitting the split branches separately to the races, the rolling bodies being driven by the races at a speed which is the resultant of the speeds of the races and in turn driving the other torque-transmitting member, a system of races and rolling bodies for variably controlling the speed of one of the races, means for generating axial pressure components for maintaining adhesive contact between the races and rolling bodies interposed in each of the paths of transmission of the split branches to the system for thereby modifying the action of the torques transmitting along said paths, said means being so related as to develop balanced and opposed axial reactions, whereby thrust bearings for taking care of such reactions can be dispensed with, and resilient cushioning means interposed in the path of transmission of impacts from the output end for modifying the effect of impacts so delivered, said last mentioned means being so constructed and related as to develop no axial reaction.

17. In a device of the character described, in combination, a plurality of torque-transmitting members, means for driving one member from the other, said means including a planetary reduction system comprising races and rolling bodies, the races being free to be driven, means for splitting the torque from one of the torque-transmitting members and transmitting the split branches separately to the races, the rolling bodies being driven by the races at a speed which is the resultant of the speeds of the races and in turn driving the other torque-transmitting member, a system of races and rolling bodies for variably controlling the speed of one of the races, both systems being provided with self-aligning bearings, means for generating axial pressure components for maintaining adhesive contact between the races and rolling bodies interposed in the paths of transmission of the split branches to the system for thereby modifying the action of the torques transmitted along said paths, said means being so related as to develop balanced and opposed axial reactions, whereby thrust bearings for taking care of such reactions can be dispensed with.

18. In a device of the character described, in combination, a plurality of torque-transmitting members, means for driving one member from the other, said means including a planetary reduction system comprising races and rolling bodies, the races being free to be driven, means for splitting the torque from one of the torque-transmitting members and transmitting the split branches separately to the races, the rolling bodies being driven by the races at a speed which is the resultant of the speeds of the races and in turn driving the other torque-transmitting member, a system of races and rolling bodies for variably controlling the speed of one of the races, both systems being provided with self-aligning bearings, and means for generating axial pressure components for maintaining adhesive contact between the races and rolling bodies interposed in the path of transmission of impacts from the output end for thereby modifying the effect of impacts so delivered, said last means being so constructed and related as to develop no axial reaction.

19. In a device of the character described, in combination, a plurality of torque-transmitting members, means for driving one member from the other, said means including a planetary reduction system comprising races and rolling bodies, the races being free to be driven, means for splitting the torque from one of the torque-transmitting members and transmitting the split branches separately to the races, the rolling bodies being driven by the races at a speed which is the resultant of the speeds of the races and in turn driving the other torque-transmitting member, and a system of races and rolling bodies for variably controlling the speed of one of the races, both systems being provided with bearings self-aligning about a common axis, and means for generating axial pressure components for maintaining adhesive contact between the races and rolling bodies interposed in the paths of transmission of the split branches to the system for thereby modifying the action of the torques transmitted along said paths, said means being so constructed and related as to develop balanced and opposed axial reactions.

20. In a power transmission mechanism, a plurality or torque-transmitting members, one being a driving member and the other a driven member, means for driving one member from the other comprising a system of adhesively contacting driving races and rolling bodies, said rolling bodies being carried by the driven member, torque-loading means intermediate one of said races and the driving member, and torque-loading means intermediate the rolling bodies and the driven member, and means interacting between said two torque-loading means whereby their opposed axial reactions balance each other.

ALAIN MADLÉ.